(12) United States Patent
Latzina et al.

(10) Patent No.: US 10,133,781 B2
(45) Date of Patent: Nov. 20, 2018

(54) DATA ITEM REFERENCE FOR A QUERY DEFINITION

(71) Applicant: SAP SE, Walldorf (DE)

(72) Inventors: Markus Latzina, Wiesenbach (DE); Slavin Donchev, Mannheim (DE)

(73) Assignee: SAP SE, Walldorf (DE)

( * ) Notice: Subject to any disclaimer, the term of this patent is extended or adjusted under 35 U.S.C. 154(b) by 274 days.

(21) Appl. No.: 15/167,280

(22) Filed: May 27, 2016

(65) Prior Publication Data

US 2017/0344606 A1    Nov. 30, 2017

(51) Int. Cl.
    *G06F 17/30* (2006.01)
(52) U.S. Cl.
    CPC .. *G06F 17/30477* (2013.01); *G06F 17/30312* (2013.01); *G06F 17/30398* (2013.01)
(58) Field of Classification Search
    CPC ......... G06F 17/30477; G06F 17/30312; G06F 17/30398
    USPC ........................................................ 707/765
    See application file for complete search history.

(56) References Cited

U.S. PATENT DOCUMENTS

| 2006/0184571 A1* | 8/2006 | Liu ................... G06F 17/30274 |
| 2013/0167059 A1* | 6/2013 | Legris .................. G06F 3/0482 715/769 |

FOREIGN PATENT DOCUMENTS

EP          2916276 A1 *   9/2015    ......... G06Q 10/0631

* cited by examiner

*Primary Examiner* — Evan Aspinwall
(74) *Attorney, Agent, or Firm* — Buckley, Maschoff & Talwalkar LLC

(57) ABSTRACT

A method, user interface, and computer-readable medium to receive a representation of a first query item, the first query item belonging to a data set and having at least one attribute; receive a representation of a second query item, the second query item being defined as relating to at least one particular attribute of another query item; associate the second query item with the first query item; automatically retrieve, in response to the second query item being associated with the first query item, a value for the at least one particular attribute of the second query item from the first query item; and save a record of the retrieved value.

19 Claims, 10 Drawing Sheets

200

```
┌─────────────────────────────────────────────────────┐
│  RECEIVE A REPRESENTATION OF A FIRST QUERY ITEM,    │
│  THE FIRST QUERY ITEM BELONGING TO A DATA SET       │
│  AND HAVING AT LEAST ONE ATTRIBUTE                  │
│                                                 205 │
└─────────────────────────────────────────────────────┘
                          │
                          ▼
┌─────────────────────────────────────────────────────┐
│  RECEIVE A REPRESENTATION OF A SECOND QUERY ITEM,   │
│  THE SECOND QUERY ITEM BEING DEFINED AS RELATING    │
│  TO AT LEAST ONE PARTICULAR ATTRIBUTE OF ANOTHER    │
│  QUERY ITEM                                     210 │
└─────────────────────────────────────────────────────┘
                          │
                          ▼
┌─────────────────────────────────────────────────────┐
│  ASSOCIATE, BY A PROCESSOR, THE SECOND QUERY ITEM   │
│  WITH THE FIRST QUERY ITEM                          │
│                                                 215 │
└─────────────────────────────────────────────────────┘
                          │
                          ▼
┌─────────────────────────────────────────────────────┐
│  AUTOMATICALLY RETRIEVE, IN RESPONSE TO THE SECOND  │
│  QUERY ITEM BEING ASSOCIATED WITH THE FIRST QUERY   │
│  ITEM, A VALUE FOR THE AT LEAST ONE PARTICULAR      │
│  ATTRIBUTE OF THE SECOND QUERY ITEM FROM THE FIRST  │
│  QUERY ITEM                                     220 │
└─────────────────────────────────────────────────────┘
                          │
                          ▼
┌─────────────────────────────────────────────────────┐
│  SAVE A RECORD OF THE RETRIEVED VALUE               │
│                                                 225 │
└─────────────────────────────────────────────────────┘
```

*FIG. 2*

DATA ITEM REFERENCE FOR A QUERY DEFINITION

BACKGROUND

A software application, device, or service may be designed and configured to provide search results in response to a query having search terms specified, at least in part, by a user thereof. In most instances, a user primarily expresses relations between the search terms using logical, database-oriented operators such as the logic operators AND, OR, etc. In some instances, the operator relating the search terms may be implicitly assumed by the application, device, or service performing the search. This may be the case when the logic operator is, most likely, the operator AND.

However, it remains the case that most conventional search applications, devices, and services rely on explicit, database-oriented operators that recite direct and literal connections between query search terms for the execution of a query based thereon. For example, a database including records of the personnel files of individuals working at a business entity might be searched for a particular address to determine whether an employee resides at a certain address. In executing a query including the address of interest as a search term, the database can be searched for the exact address attributes (e.g., street name and number, city, state, and postal code). In an instance a desired result is not achieved, further queries may be made by applying an additional filter (e.g., modified search term(s)) to the overall data set of the database.

In some contexts, there may exist a desire to more precisely define a complete query in an efficient manner.

BRIEF DESCRIPTION OF THE DRAWINGS

FIG. 2 is an illustrative flow diagram of a process of an example embodiment;

DETAILED DESCRIPTION

The following description is provided to enable any person in the art to make and use the described embodiments. Various modifications, however, will remain readily apparent to those in the art.

Figure 1:
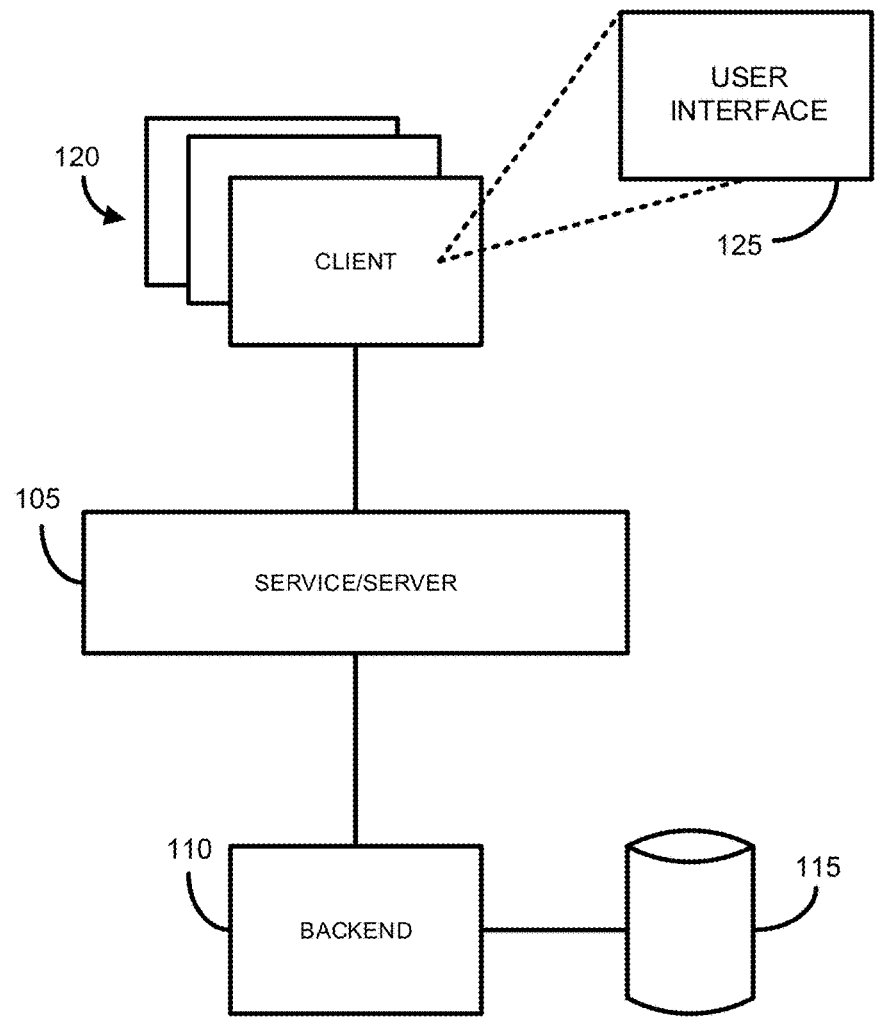
FIG. 1 is an illustrative block diagram of a logical architecture for a system of an example embodiment.

FIG. 1 is an illustrative depiction of a logical architecture for a system that may benefit from and/or support some of the aspects of the present disclosure. In the context of system 100, one or more software applications or services (i.e., "service") 105 may operate to provide search results to client devices 120. Service 105 may be implemented, at least in part, as a cloud service with one or more aspects facilitated by one or more server having a processor to execute machine-readable instructions where the machine-readable instructions may be embodied in any form of tangible media, including those now known and those that become known in the future. Accordingly, service 105 is labeled a service/server.

Operation of the search capabilities and functionality of service 105 may be supported and facilitated by a backend system 110. System 110 may include at least one processor, a local memory, a communication interface for communicating (e.g., receiving and transmitting) information to and from other devices, systems, and components, such as, for example, a database 115. In some configurations, database 115 may comprise a repository including a data set of data items that may be searched during the execution of a query by service 105.

Client devices 120 may communicate and interface with service 105. Client devices 120 may include a portable communication device or system, including but not limited to, a "smartphone", a tablet computing device, a "smartwatch" or other wearable computing device having at least some form of a user interface, a laptop, and other devices compatible with the teachings herein. In some aspects, client devices provide a frontend of system 100, a mechanism to transmit/receive information to/from a user. Client devices 120 may include a user interface as shown at 125.

In some aspects herein, a number of features of a user interface (UI) will be discussed herein. It is noted however that at least some of the UI's shown herein (e.g., 125) are examples of implementing the underlying concepts disclosed herein, that may extend beyond one or more specific implementations of a UI.

In some instances, a user may submit one or more search terms to service 105 via UI 125, wherein service 105 in combination with backend system 110 can execute a query including the search terms, including searching data items stored in database 115, and return search results to the user at UI 125.

In accordance with some embodiments herein, some query items comprising a query herein may, simultaneously, be used both as a query item and as reference or anchor for defining a second query item. In accordance with these aspects, some embodiments herein include a first query item that is a content item of a data set (e.g., a data record) and a second query item that relates to another (e.g., the first) query item. The first query item may act as an anchor or a reference for the second query item. The second query item may refer to the first query item for values of one or more particular attributes. In some aspects, values of one or more attributes of the first query item (i.e., the data item of a data set to be queried) may be carried over, imported, or referenced by the second query item. In one way, a combination of the first query item and the second query item may be used to configure search term(s) that are more complete than conventional search terms that each refer to attributes of data items in a data set.

In some aspects, the data item of a data set herein will be referred to as a first query item. This first query item can be any data structure stored in and included in a data set that may be persisted by, for example, one or more database instances. The first query item includes one or more attributes or properties that indicate characteristics of the first query item. The first query item may also be referred to as an anchor or reference item.

Herein, a query item that refers to at least one particular attribute of another query item (as opposed to its own attributes associated with a data item in a data set) is referred to as a second query item. The second query item herein is defined as relating to at least one particular attribute of another query item. In some instances, a second query item herein may be referred to as an anchor query item since it refers to an anchor item.

In some embodiments, as will be illustrated below, a second query item may be at least partially pre-defined, wherein a user (or other entity) may specify some variable aspects of the second query item and other static aspects of the second query item are predetermined or fixed (e.g., by a service or application designer). A second query item herein may be at least partially predefined and may, in some or those instances, be referred to as a template. In some instances, the second query item may be specified "on-the-fly" by a user (or other entity) as they need a second query item.

As a brief example, a first query item may be a data record of a person including the person's name, address, and profession that is stored in a database. In accordance with the present disclosure, a second query item is predefined to refer to a location attribute of another query item (e.g., the first query item) and can accept values from the other query item (i.e., the first query item). In some embodiments, the second query item may also accept one or more values related to the attribute(s) referenced thereby from a user (or other entity). In this example, the second query item may refer to the address attribute of the first query item (as opposed to the any attribute of another data item in the data set to be searched). Further, the second query may be defined to illicit a range value for the related location referenced by the second query. Continuing with the same example, a use may be asked to provide a value for a range that the search result should be located within to the address of the first query item's address attribute (e.g., provide results within n miles or kilometers of the address of the first query item).

FIG. 2 is an illustrative depiction of a flow diagram for a process herein, according to some embodiments. At operation 205, a representation of a first query item is received. The first query item belongs to a data set persisted by a data sore of some sort and embodiment and has at least one attribute.

At operation 210, a second query item is received. The second query item may be at least partially pre-defined. The second query item is defined, whether pre-defined or not, as relating to another query item. In some aspects, the second query item need not refer to a specific other query item but rather to at least one attribute of another query item.

Process 200 continues to operation 215 where a computer or other device implemented processor associates the first query item with the second query item. In some instances, a user may provide an indication to the computing device that the first and second query items are to be associated with each other via selective user manipulations of UI elements of a UI.

At operation 220, in response to the associating of the first query item and the second query item at operation 215, a value for the at least one particular attribute of the second query item is retrieved from the first query item. In the example introduced earlier, the second query item is a "location" anchor query item that references the location attribute of the first query item (i.e., the address in the personal data record). Per operation 220, the address in the data item represented by the first query item is retrieved from the data set. Continuing to operation 225, the retrieved value for the address is saved. In some aspects, the saved value may be reported to a user and/or used in other processing operations.

Figure 3:
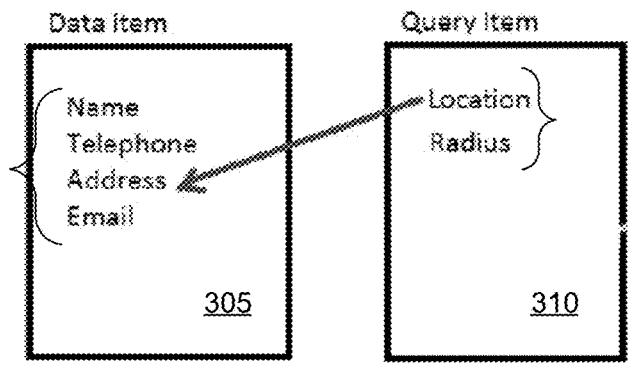
FIG. 3 is an illustrative depiction of some aspects of a user interface of an example embodiment.
Figure 4:
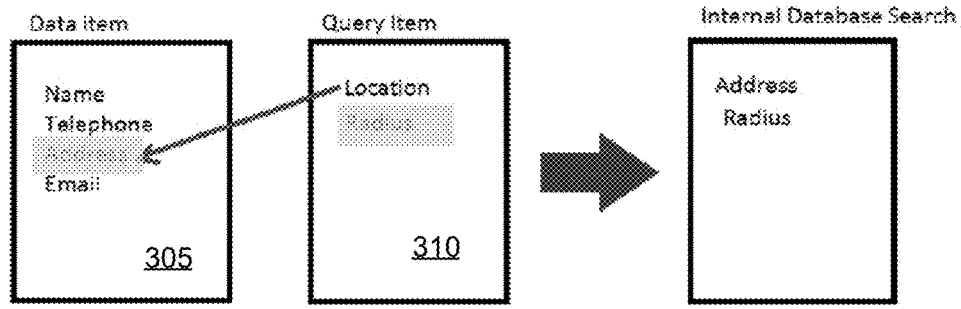
FIG. 4 is an illustrative depiction of some aspects of a user interface including aspects for building a query of an example embodiment.

FIGS. 3 and 4 provide illustrative depictions of a UI implementation that uses a visuo-spatial (i.e., visual and spatial) UI metaphor for generating and building a query, in accordance with some aspects herein. FIG. 3 includes aspects of a UI 300 having a first query item 3005 and a second query item 310. Query item 305 is a data item having attributes of a name, telephone number, address, and an email address. The second query item 310 is an anchor query item defined as referencing a location of another query item, as shown by arrow 315. The second query item also contains its own property/attribute, as illustrated by the radius attribute.

FIG. 4 illustrates the construction of a query herein that is accomplished by associating or combining the address of the first query item 305 that is referenced or pointed to by the second query item 310. The database at 405 can then be searched/queried for locations within the "radius" specified by the second query item for the "address" of the first query item. For example, the database can be searched for other persons in the data set that have addresses within 5 miles of the address of John Smith, wherein the John Smith data item (personal data record) is specified by the first query item, the address attribute from the first query item is specified by the second query item, and the range value of 5 miles is also included in the second query item. In this manner, a specific, precise query can be constructed in an efficient manner.

Figure 5:
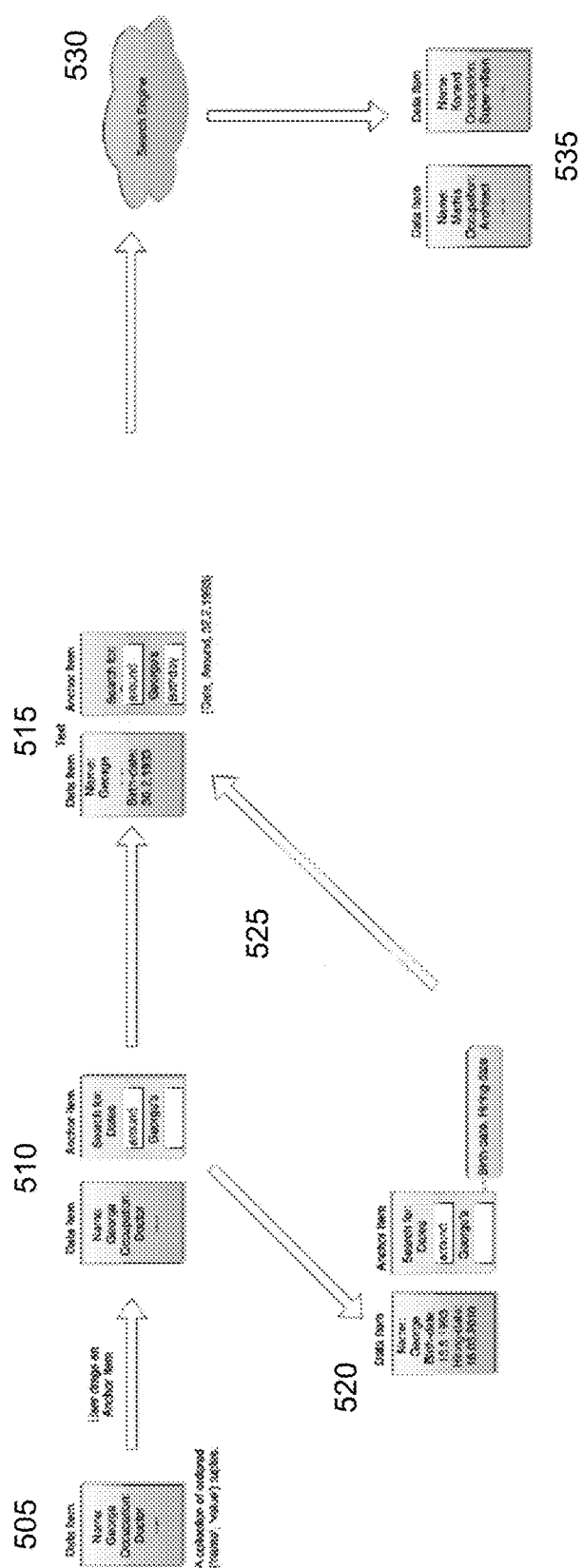
FIG. 5 is an illustrative depiction of a process to build and execute a query of an example embodiment.

FIG. 5 is an illustrative example of an overview of a process flow 500, for some embodiments herein. At 505, a first query item is received or otherwise selected or identified by a user, preferably in a graphical UI including a graphical representation of the first query item. In some embodiments, at 510, selects or manipulates (e.g., drags) the first query item into a proximate location with the second query item. In some aspects, either the first query item and/or the second query item can be moved relative to the other.

At 510, the system, service, or device associates the first query item and the second query item with each other in response to the user's (or other entity's) manipulation of the UI representations of the first and second query items relative to each other. Further, a determination is made at 510 whether there first query item has only one tuple of the type specified by the second query item. In the case there is just on such tuple, then process 500 proceeds to 515. For example, the second query item specifies a date attribute of the first query item and the first query item includes only one date. Otherwise, process 500 proceeds to operation 520 where the multiple possible tuples of the first query item are determined and presented to the user (or other entity) at 520.

For example, the second query item specifies a date attribute of the first query item and the first query item includes three dates. The user (or other entity) may be presented with all of the two possible dates and the user (or other entity) can specify which one(s) of the dates will be used for the query at 525. The process continues to 515.

At 515, query search terms including the combination or association of the first and second query items as disclosed herein are generated. In an example for FIG. 5, the search terms at 515 can include a search for dates around George's birthday, where the first query item is a data item including George's bibliographic information (e.g., name, address, date of birth, his hire date, his address, and email address) and the second query item is defined to refer to a date around (i.e., "near") a person's birthday as included in another query item. In the present example, the user selected George's birthday from a plurality of choices at 525 by determining the hire date could not logically be his birthday.

At 530, the values from 515 are submitted to a search engine functionality and used to search the database for results that satisfy the search criteria. The search results can be presented to the user (or other entity) in a UI at 535. In this example, other persons (e.g., employees) listed in the database having birthdays around George's can be returned in the results at 535.

Figure 6:
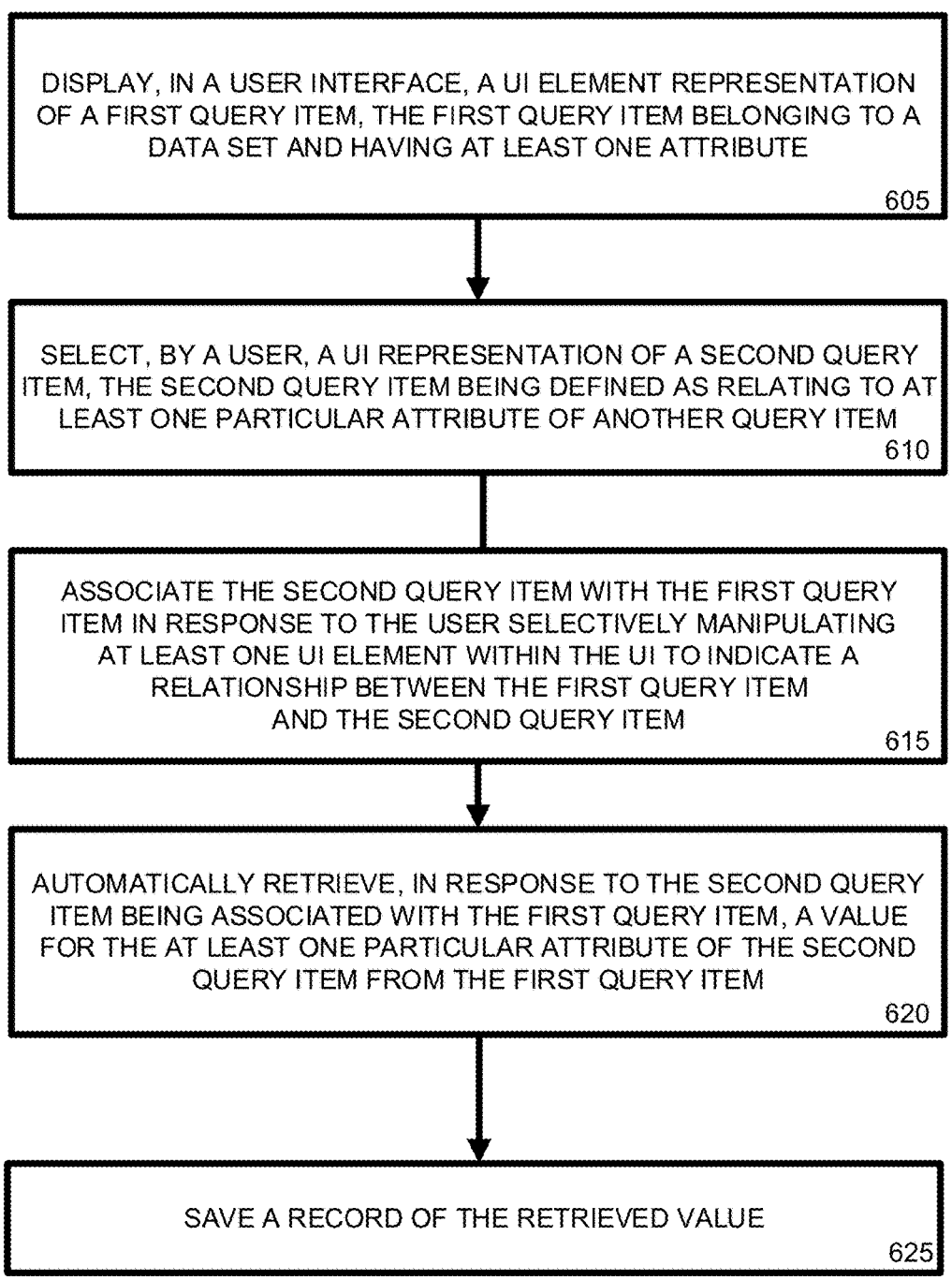
FIG. 6 is an illustrative flow diagram of a process of an example embodiment.

FIG. 6 is an illustrative flow diagram of a process including a user interface (UI) for facilitating some of the embodiments herein. FIG. 6, in some aspects, relates to a UI for implementing some aspects of some processes herein. At operation 605, a UI representation of a first query item is displayed. The first query item belongs to a data set persisted by a data sore of some sort and embodiment and has at least one attribute.

At operation 610, a second query item is selected by a user (or other entity). The second query item may be at least partially pre-defined. The second query item is defined, whether pre-defined or not, as relating to another query item.

Process 200 advances to operation 615 where a computer or other processor implemented device associates the first query item with the second query item. In some instances, a user may provide an indication to the computing device that the first and second query items are to be associated with each other by selective user manipulations of UI elements of the UI. Different types of UI element manipulations can be leveraged, some examples of which will be disclosed below.

At operation 620, in response to the associating of the first query item and the second query item at operation 615, a value for the at least one particular attribute of the second query item is retrieved from the first query item. Continuing to operation 625, the retrieved value for the address is saved. In some contexts and use-cases, the saved value may be reported to a user and/or used in other processing operations.

Figure 7:
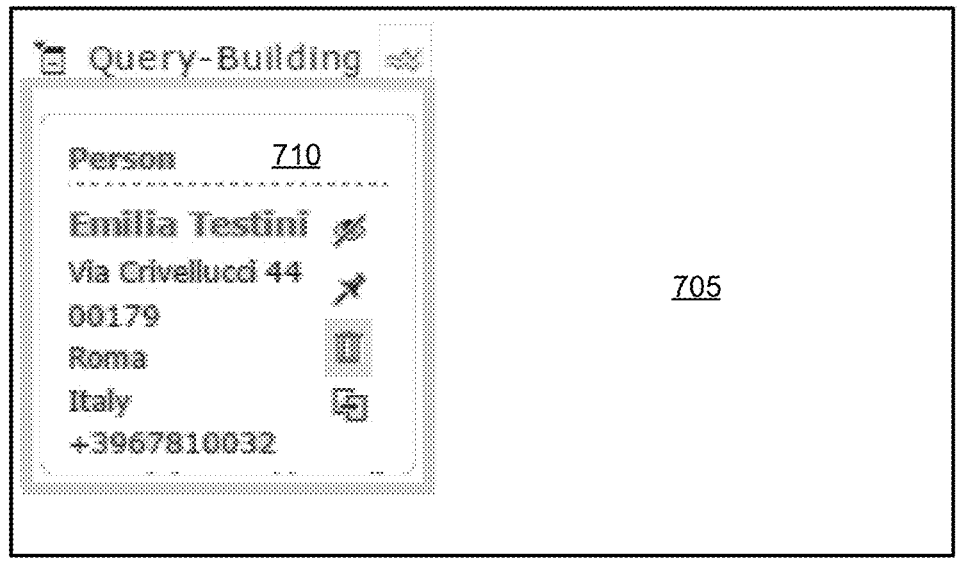
FIG. 7 is an illustrative depiction of a user interface including a query building area of an example embodiment.

FIG. 7 is an illustrative depiction of one embodiment of a part of a UI 700, in accordance with some aspects herein. UI 700 includes a query building area, generally shown at 705 and a first query item 710 location in or thereon. Query item 710 is a data record with attributes relating to a person.

Figure 8:
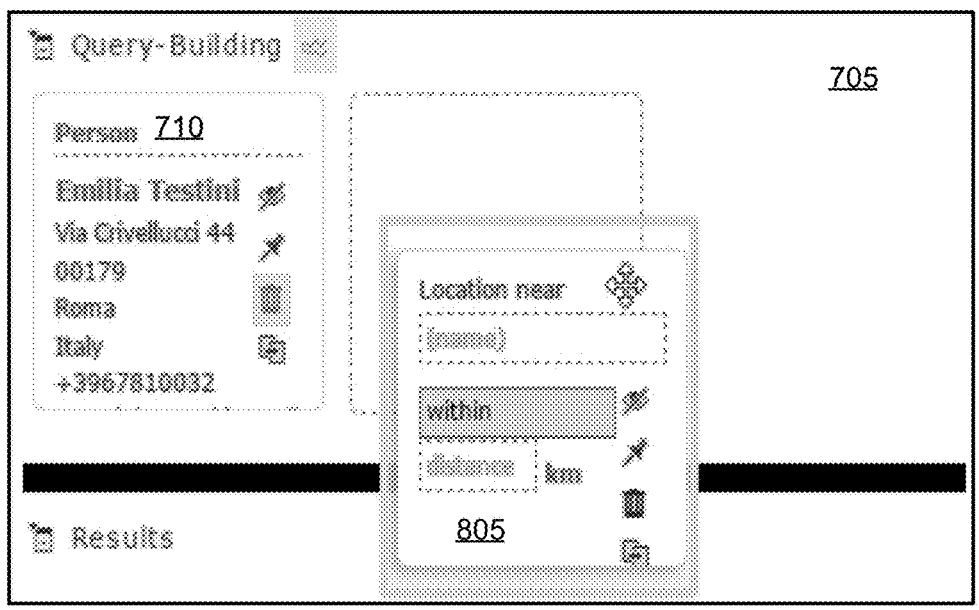
FIG. 8 is an illustrative depiction of some aspect of a user interface including an example of a user manipulation of user interface elements of an example embodiment.

FIG. 8 shows the query building area 705 of the UI, where a second query item 805 has been manipulated into close proximity to the first query item 710. The relative closeness of the first and second query items relative to each other signals to the system supporting the UI that these two query items are to be combined or otherwise associated with each other.

Figure 9:
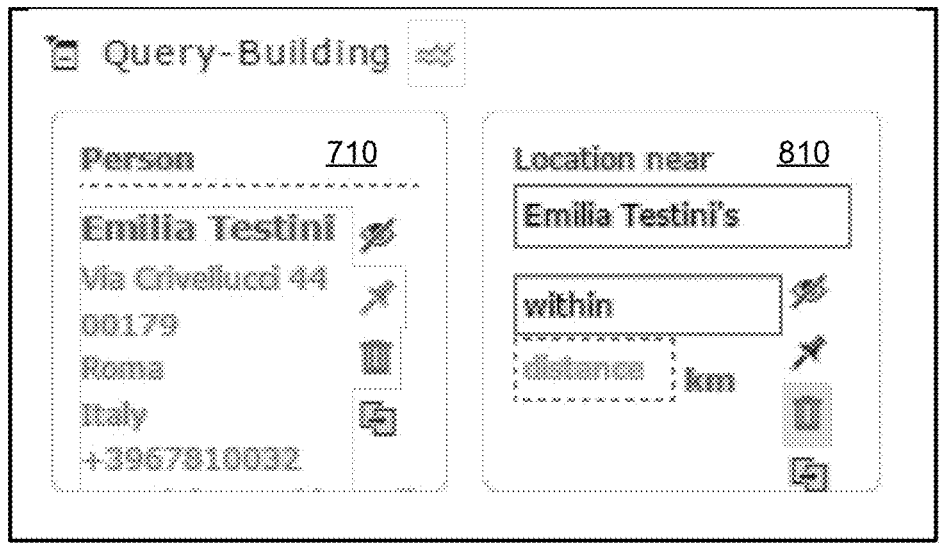
FIG. 9 is an illustrative depiction of some aspect of a user interface including an example of associating a second query item with a first query item of an example embodiment.
Figure 10:
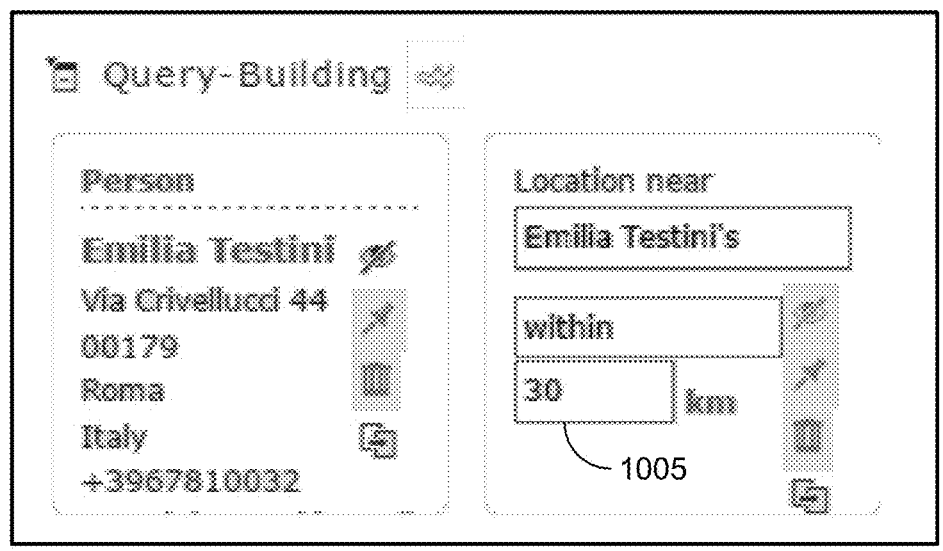
FIG. 10 is a further illustrative depiction of some aspect of a user interface including aspects of a user manipulation of user interface elements therein of an example embodiment.

FIG. 9 is a view of the UI subsequent to FIG. 8. In FIG. 9, the name of the data item of the first query item 710 is retrieved from the first query item by the second query item 810, as discussed in the processes introduced above. FIG. 10 further illustrates a specification of a user-supplied value at 1005. While the second query item is predefined to include a space-holder for the specific range, a user has to provide the particular value at 1005.

Figure 11:
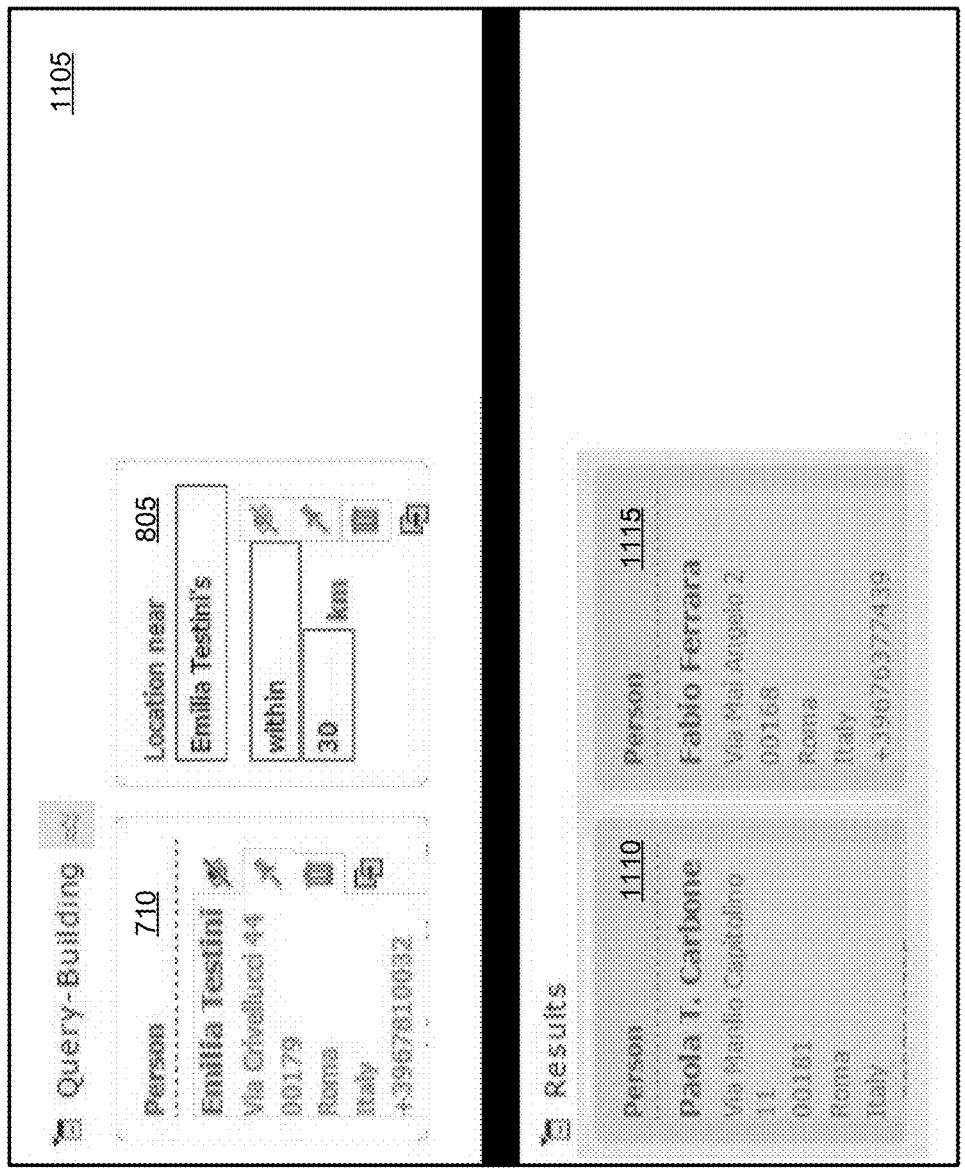
FIG. 11 is an illustrative depiction of a user interface including results of a query executed user a query generated based on an example embodiment.

FIG. 11 includes a results section of a UI, as shown at 1105, in accordance with some examples. In particular, FIG. 11 includes data records that satisfy the search criteria including the search terms determined by the combination of the first and second query items (710 and 805). It is seen that the search results include the two files 1110 and 1115.

Figure 12:
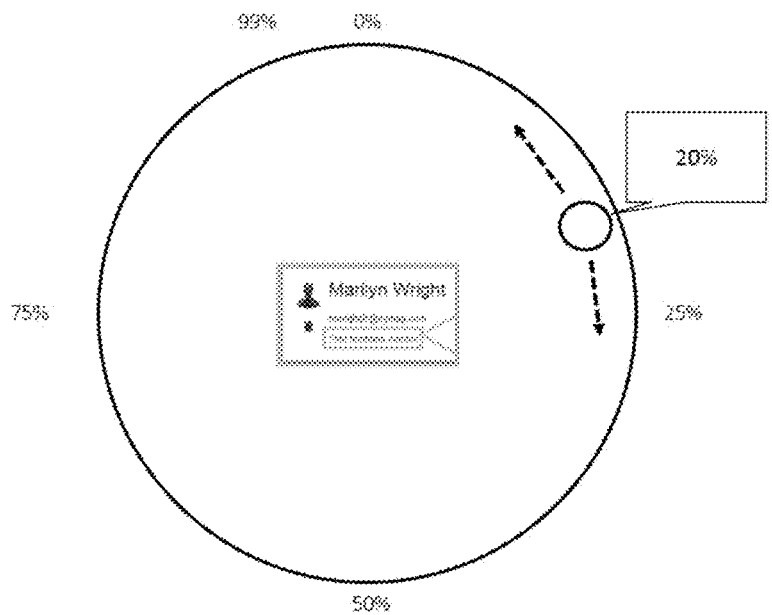
FIG. 12 is an illustrative depiction of a user interface including a UI control element of an example embodiment.
Figure 13:
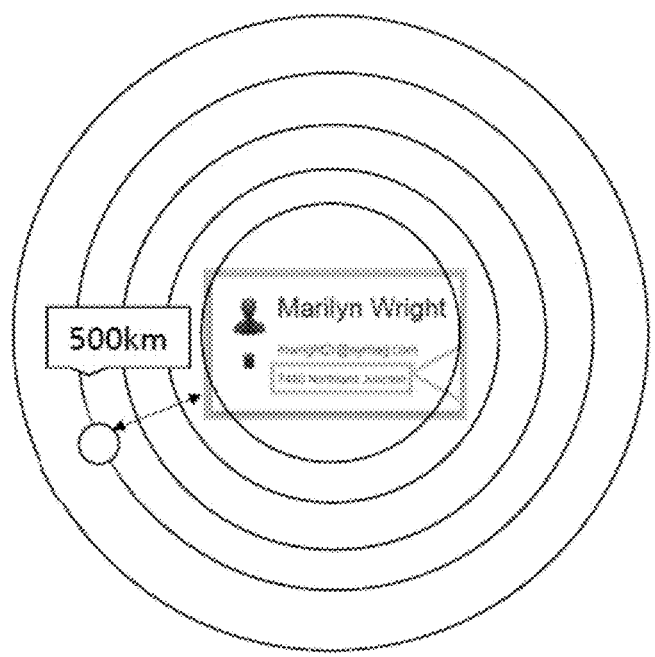
FIG. 13 is an illustrative depiction of another UI control element of an example embodiment.
Figure 14:
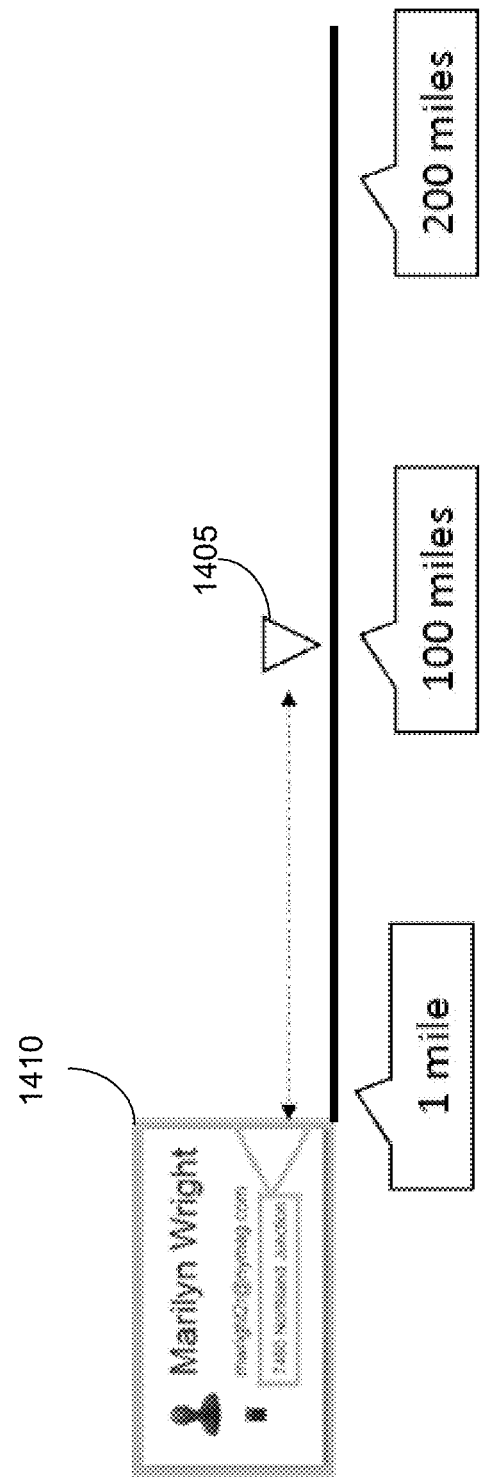
FIG. 14 is an illustrative depiction of yet another UI control element of an example embodiment.

FIGS. 12, 13, and 14 are different mechanisms for, in some example embodiments, specifying aspects of the attributes of a first query item and a second query item herein. FIG. 12 is a UI element comprising a "knob" 1205 that allows a user to indicate how remote result items should be from a reference item that is located at the center of the dial 1200. The "knob" UI element 1205 can be manipulated by a user to vary the value represented thereby. In the present example of FIG. 12, the maximum distance is 1000 miles and the knob 1205 can vary the percentage to be applied. For example, 20% Of 1000 miles is 200 miles.

FIG. 13 is a visual scale comprising concentric circles, where the circles represent distances. As such, the reference item 1305 is located in the center of the visual scale and the circles represent distances therefrom. A user selectively indicates how far one attribute can be at a maximum and still be considered valid.

FIG. 14 is an illustrative depiction of a linear scale, wherein a pointer mechanism 1405 is used to visually indicate a distance an object can be from a referenced item 1410. It is noted that FIGS. 12-14 are examples of UI elements that can be used in some aspects herein, alone or in combination.

Aspects of the processes, systems, and services discussed hereinabove may be implemented through any tangible implementation of one or more of software, firmware, hardware, and combinations thereof.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations.

What is claimed is:

1. A method of generating a query, the method comprising:
   receiving a representation of a first query item, the first query item being a data structure belonging to a data set and having at least one attribute;
   receiving a representation of a second query item, the second query item being an anchor query item type of data structure defined as relating to at least one particular attribute of another query item;
   receiving an indication of a user selectively positioning one of a user interface (UI) element representation of the first query item and a user interface (UI) element representation of the second query item in proximate location to the representation of the other UI element representation of the first query item and the second query item in a visio-spatial user interface, the visio-spatial user interface including a display of both the UI element representation of the first query item and the UI element representation of the second query item;

associating, by a processor, the second query item with the first query item;

automatically retrieving, in response to the second query item being associated with the first query item, a value for the at least one particular attribute of the second query item defined as relating to another query item from the first query item;

generating, by the processor, query search terms including a combination of the retrieved value and the second query item; and saving a record of the query search terms.

2. The method of claim 1, wherein the data set comprises a database.

3. The method of claim 1, wherein the first query item is a result of a query execution.

4. The method of claim 1, wherein the at least one particular attribute is an attribute type.

5. The method of claim 1, further comprising defining the first query item.

6. The method of claim 1, wherein the second query item comprises a data structure having at least one predefined particular attribute.

7. The method of claim 1, further comprising determining whether the at least one attribute of the first query item is compatible with the at least one particular attribute defined for the second query item.

8. The method of claim 7, further comprising, in an instance there are multiple attributes of the first query item that are compatible with the at least one particular attribute defined for the second query item, determining each of the attributes of the first query item that is compatible with the at least one particular attribute defined for the second query item.

9. The method of claim 1, wherein the first query item includes a plurality of data items belonging to the data set, each having at least one attribute.

10. A method of generating a query in a user interface, the method comprising:

displaying, in a visio-spatial user interface generated by a processor based device, a user interface (UI) element representation of a first query item, the first query item being a data structure belonging to a data set and having at least one attribute;

displaying, in the visio-spatial user interface, a UI element representation of a second query item, the second query item being an anchor query item type of data structure defined as relating to at least one particular attribute of another query item;

receiving an indication of a user selectively positioning one of the UI element representation of one of the first query item and the UI element representation of the second query item in proximate location to the UI element representation of the other of the first query item and the second query item in the visio-spatial user interface, the visio-spatial user interface including a display of both the UI element representation of the first query item and the UI element representation of the second query item;

associating, by a processor, the second query item with the first query item in response to the user selectively manipulating at least one of the UI element representation of the first query item and the UI element representation of the second query item within the visio-spatial user interface to indicate a relationship between the first query item and the second query item;

automatically retrieving, in response to the second query item being associated with the first query item, a value for the at least one particular attribute of the second query item defined as relating to another query item from the first query item;

generating, by the processor, query search terms including a combination of the retrieved value and the second query item; and saving a record of the query search terms.

11. The method of claim 10, wherein the data set comprises a database.

12. The method of claim 10, wherein the first query item is a result of a query execution.

13. The method of claim 10, wherein the at least one particular attribute is an attribute type.

14. The method of claim 10, wherein the associating is performed in response to at least one of the following actions:

a user positioning the UI representation of the second query item in proximate location to the displayed UI element representation of the first query item in the user interface indicated by the user; and a user selectively manipulating a UI element in the UI to specify a value for a strength of the relationship between the second query item and the first query item in the user interface.

15. The method of claim 10, wherein the second query item comprises a data structure having at least one predefined particular attribute.

16. The method of claim 10, further comprising determining whether the at least one attribute of the first query item is compatible with the at least one particular attribute defined for the second query item.

17. The method of claim 16, further comprising, in an instance there are multiple attributes of the first query item that are compatible with the at least one particular attribute defined for the second query item, determining each of the attributes of the first query item that is compatible with the at least one particular attribute defined for the second query item.

18. The method of claim 10, wherein the first query item includes a plurality of data items belonging to the data set, each having at least one attribute.

19. The method of claim 10 further comprising, subsequent to the associating, displaying the second query item in an expanded version of the first query item including a visual representation of the at least one particular attribute of the second query item.

* * * * *